United States Patent [19]
Weisbrich

[11] 3,980,842
[45] Sept. 14, 1976

[54] TELEPHONE LISTENING COMFORT ADAPTOR (TLCA)

[76] Inventor: Alfred L. Weisbrich, 113 Lake Road, Pocantico Hills, N. Tarrytown, N.Y. 10591

[22] Filed: Mar. 5, 1975

[21] Appl. No.: 555,549

[52] U.S. Cl. ............................................ 179/182 R
[51] Int. Cl.² ........................................ H04R 1/10
[58] Field of Search ............... 179/185, 184, 182 R, 179/187, 178, 156 R

[56] References Cited
UNITED STATES PATENTS

| | | | |
|---|---|---|---|
| 1,809,349 | 6/1931 | Moore | 179/156 R |
| 2,843,680 | 7/1958 | Pollard | 179/156 R |
| 3,651,285 | 3/1972 | Tomaiuolo | 179/178 |

FOREIGN PATENTS OR APPLICATIONS

| | | | |
|---|---|---|---|
| 420,985 | 9/1927 | Germany | 179/156 R |
| 4,502 | 10/1913 | United Kingdom | 179/182 R |

Primary Examiner—Thomas W. Brown

[57] ABSTRACT

An attachment to or an integral part of a telephone handset, such attachment or integral part consisting of an appendage connected with the receiver of said handset and designed to function primarily as a pivot, sound conducting device, pivot and rest against the head in a vicinity peripheral to an ear intended as recipient of audio transmission from said handset receiver. Furthermore, said device is designed to function as a spacer to prevent the receiver housing of said telephone handset from physically pivoting on and/or resting on or contacting said ear which would otherwise cause the latter to be deformed from its natural shape or state.

5 Claims, 4 Drawing Figures

TELEPHONE LISTENING COMFORT ADAPTOR (TLCA)

BACKGROUND OF THE INVENTION

This invention relates to a telephone listening comfort enhancement class of devices, and more specifically to a device of this type being an attachable or integral part of a telephone handset with receiver, pivotable and restable against the human head peripheral to an ear and intended primarily as a pivot, sound conducting device, rest and spacer to prevent the receiver housing of said handset from physically pivoting against and/or contacting and resting on said ear which would otherwise cause the latter to be deformed from its natural shape or state.

Under general circumstances, a person using a conventional telephone handset rests and pivots the receiver housing of said handset against an ear, often partially deforming said ear from its natural state, preventing normal or adequate ventilation of said ear, and/or transmitting unsanitary deposits either from ear to receiver or receiver to ear or both, resulting, thereby, often in irritation, excessive heat build up and/or perspiration or general discomfort of said ear and making unsanitary conditions an added possibility.

Accordingly, an object of the present invention is the provision of a simple, inexpensive, single body structure being readily adaptable or integrateable onto or into a telephone handset to avoid the practical necessity of resting and pivoting the receiver housing of said telephone handset directly on an ear during normal operation of said handset.

Another object of the present invention is the provision of a simple and inexpensive means of preventing the normal discomforts and unsanitary or unhygenic conditions resulting from otherwise physically resting and pivoting the receiver housing of a telephone handset against an ear.

Another object of the present invention is the enhancement of audio transmission between receiver of a telephone handset and the listener by means of the principle of bone conduction of sound via indirect cranium contact with the present invention, to be designated TLCA, henceforth and being constructed of suitably rigid sound conducting material.

Another object of the invention is to provide for a singular and distinct pivoting means and structure about which the telephone handset may be pivoted in virtually any direction, as for example away from the mouth, while still maintaining contact with the listener in the periphery of an ear and maintaining, thereby, conduction of sound from the receiver in said handset to the intended listener via the sound conducting TLCA device.

SUMMARY OF THE INVENTION

There is provided in accordance with the present invention an improvement in telephone listening comfort and hygenic conditions by circumventing the present conventional practical necessity of physically resting and pivoting the receiver housing of a telephone handset against an ear, by means of an attachment or integration of a TLCA onto or into said handset, with the TLCA acting, thereby, as a pivot and rest for said handset against the head peripheral to an ear.

DESCRIPTION OF THE PREFERRED EMBODIMENT

Figure 1:
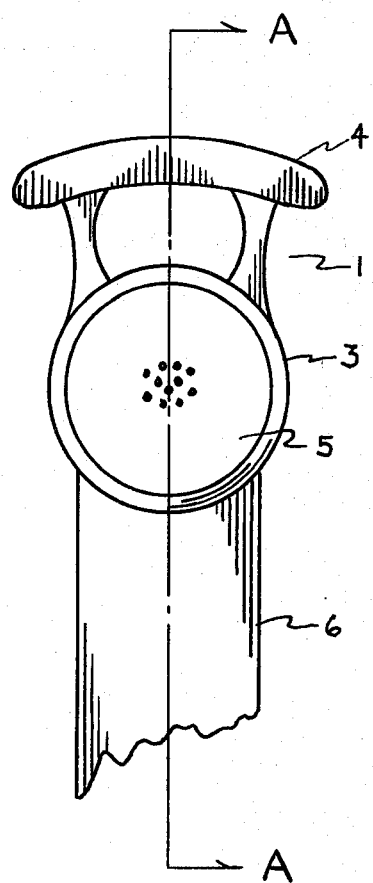
FIG. 1 is a front elevation view of a TLCA in relation to a receiver of a telephone handset.
Figure 2:
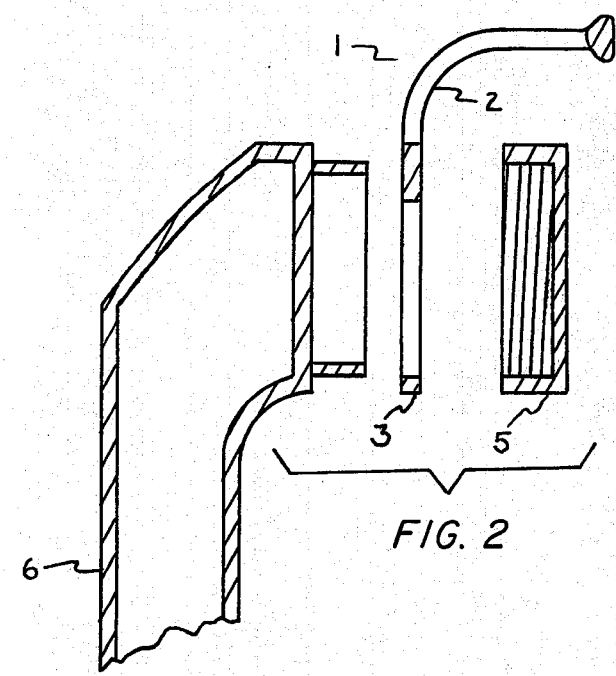
FIG. 2 is a sectional side view of a TLCA in relation to a disassembled receiver section of a telephone handset.

Referring to the drawings in greater detail, wherein like reference numerals designate the same or identical parts throughout the several views, and more specifically to FIG. 1 and 2, there is shown a TLCA, generally designated by the reference number 1. The device includes pivot arms 2, which may be replaced by a single arm and which may furthermore be shell-like in structure, and a rest or support bridge 4. The pivot arm, when in the form of a rigid concave shell structure, serves as a transmitter and conductor of sound through its internal material structure as well as an external noise suppressor and deflector of receiver sound toward the ear cavity. The attachment to a telephone handset, if other than an integral part of the handset housing, is accomplished via a structure which is ring-like 3 and is mounted between the receiver housing 5 and the receiver housing cap 6. The above attachment described is intended merely as one example of many other attachment means possible which allows contact between the telephone receiver unit and the TLCA device.

Figure 3:
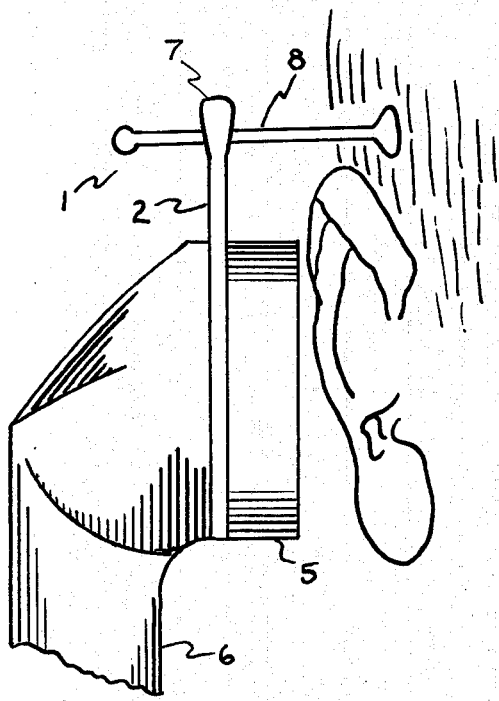
FIG. 3 is a side view of a TLCA with adjustable length pivot arm in relation to a receiver of a telephone handset and an ear.

FIG. 3 shows a TLCA with an adjustable pivot arm 8 whose length can be modified within certain limits relative to the pivot arm adjustment support 7. This allows compensation for anatomical variation in ear protrusion.

Figure 4:
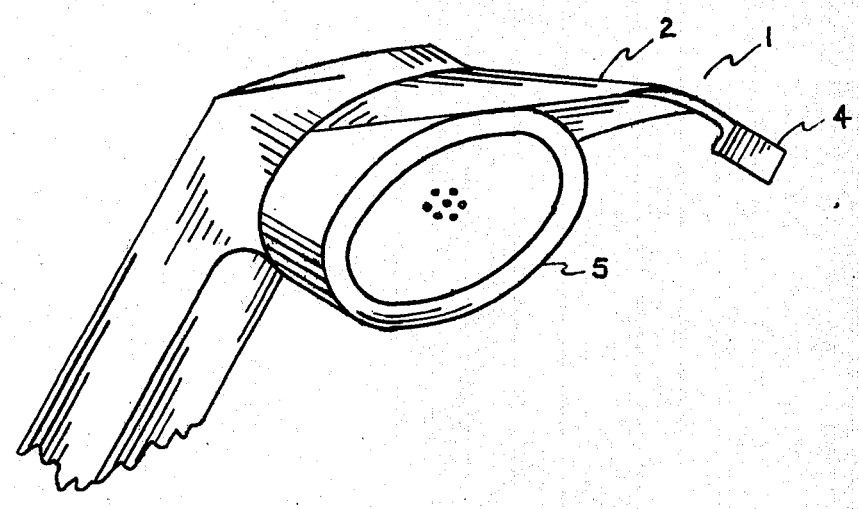
FIG. 4 is a side view of a TLCA with pivot arm being a rigid sound conducting shell structure.

FIG. 4 shows a TLCA with pivot arm 2 being a rigid sound conducting shell structure. The latter serves to conduct sound within its material from receiver to the listener for bone conduction of sound in the periphery of an ear. It furthermore serves to reflect sound from the receiver into the ear and aids in deflecting external noise.

Various changes may be made in the details of construction, including the choice of materials, variation in design, color, size and geometry and structure, without departing from the spirit or scope of the invention as defined by the appended claims.

I claim:

1. A telephone listening comfort adaptor comprising: a device of sound conducting material, being attachable to a telephone receiver unit, as in a telephone handset, providing for a pivot arm and rest, the latter to be placed under normal use against the bony part of the head peripheral to an ear and said device being intended to conduct audio transmission of sound from the receiver to the intended listener via bone conduction of sound through said device contacting a bony region peripheral to an ear, and to serve as a distinct singular pivoting device and means about which the telephone handset may be pivoted in virtually any direction while still maintaining contact with the listener and yet maintaining a space between said handset and the ear and furthermore maintaining thereby conduction of sound from said receiver through the specified device to the intended listener.

2. A device according to claim 1, whose pivot arm is substantially a sound conducting concave shell structure which serves to conduct audio waves internally within the shell material structure to the bony part of the head peripheral to an ear and aids in shielding the listener's ear from extraneous external noise and further aids in directing sound waves by reflection from the receiver unit to the ear cavity of an intended listener.

3. A device according to claim 1, comprising a plurality of pivot arms terminating at a singular rest structure.

4. A device according to claim 1, comprising a pivot arm that is adjustable in nature for variability of length adjustment between a telephone receiver unit and contact with an intended listener's head.

5. A device according to claim 1, being substantially a unit body structure.

* * * * *